United States Patent [19]

Fernandez et al.

[11] 4,334,634

[45] Jun. 15, 1982

[54] CIGARETTE DISPENSER ADAPTOR

[76] Inventors: Jose R. J. Fernandez, Box 112, Carolina, P.R. 00630; Fernando B. Gonzalez, Calle 6 Bloque L-3, Urb. Cupey Gardens, R. P., P.R. 00928

[21] Appl. No.: 192,240

[22] Filed: Sep. 30, 1980

[51] Int. Cl.[3] .............................................. B65G 59/00

[52] U.S. Cl. .................................... 221/131; 221/199; 221/241

[58] Field of Search ............... 221/199, 241, 242, 131, 221/261, 197, 198; 194/2

[56] References Cited

U.S. PATENT DOCUMENTS

| | | | |
|---|---|---|---|
| 2,585,872 | 2/1952 | Steiner | 221/242 UX |
| 3,282,466 | 11/1966 | Meresz et al. | 221/242 X |
| 3,360,091 | 12/1967 | Baum | 194/2 |
| 3,601,237 | 8/1971 | Ousienko | 194/2 |
| 3,757,998 | 9/1973 | Millies et al. | 221/242 |
| 3,862,704 | 1/1975 | Millieo et al. | 221/242 |
| 4,096,969 | 6/1978 | Ragusa | 221/199 |

*Primary Examiner*—Allen N. Knowles

*Attorney, Agent, or Firm*—Eric P. Schellin

[57] ABSTRACT

An apparatus for adapting a conventional mechanical cigarette vending machine having an upper tier of magazines and a lower tier of magazines, a first shelf for supporting a primary stack of cigarettes and a second shelf for supporting a reserve stack of cigarettes, to dispense cigarette packages containing one-half the number of cigarettes in a conventional package of cigarettes.

The apparatus consists of three elements: an L-shaped insert designed to be attached to the pusher plate for moving the reserve stack of cigarettes into the vending position, a second insert designed to be attached by means of clips to the vertical wall of the forward portion of the magazine, and a clip element designed to be attached to the floor of this magazine below the reserve stack of cigarettes. This apparatus maintains the stack of packages of cigarettes, containing one-half the number of cigarettes in a normal package, in stacked relationship. The clip prevents the accidental vending of more than one package of cigarettes at a time.

5 Claims, 8 Drawing Figures

CIGARETTE DISPENSER ADAPTOR

BACKGROUND OF THE INVENTION

In certain sections of the world such as Latin America and Puerto Rico the price of cigarettes is very high due to taxes and other considerations. For this reason the cigarette companies sell packages containing half the normal number of cigarettes (half packs). Existing vending machines are commonly incapable of handling these half packs of cigarettes. The older machines have heretofore been limited to regular pack size and have had to be converted at a considerable expense to accomodate the thinner half packs.

Conversion kits have been devised to enable the vending machines to vend "king" size cigarettes. The prior art does not disclose any kits designed to adapt the vending machines to vend half packs.

U.S. Pat. Nos. 3,601,237 and 4,096,969 are typical of the prior art in adaptors designed to convert vending machines to vend the "king" size cigarettes.

SUMMARY OF THE INVENTION

In accordance with the foregoing invention an apparatus is provided for adapting a conventional mechanical cigarette vending machine, that is composed of an upper tier of magazines and a lower tier of magazines, with a first shelf for supporting a primary stack of cigarettes and a second shelf for supporting a reserve stack of cigarettes, to dispense the thinner half packs of cigarettes. The adaptor kit consists of three elements: an L-shaped insert designed to be attached to the pusher plate positioned behind the reserve stack of cigarettes. The L-shaped element is stamped from a single piece of metal and consists of a short narrow panel and a longer wider panel. The short panel has downwardly extending ears on the top thereof. The second element is an elongated flat U-shaped element. The front panel of the element has narrow L-shaped flanges on either side thereof. The L-shaped flanges have at least four small clips punched out of the portion parallel to the flat panel for attaching the element to the vertical wall of the magazine. The distance between the flanges on the longer panel of the L-shaped element and the width of the front panel of the U-shaped element is equal to the length of a package of cigarettes. These elements keep the packages of cigarettes stacked in a facedown relationship.

The third element is a clip designed to be attached to the floor of the structure supporting the reserve stack of cigarettes to prevent accidental vending of more than one pack of cigarettes at a time.

The adaptor kit of the instant invention is designed to be used with vending machines of the type shown in U.S. Pat. No. 2,952,384, issued Sept. 13, 1960.

DESCRIPTION OF THE PREFERRED EMBODIMENT

Figure 1:
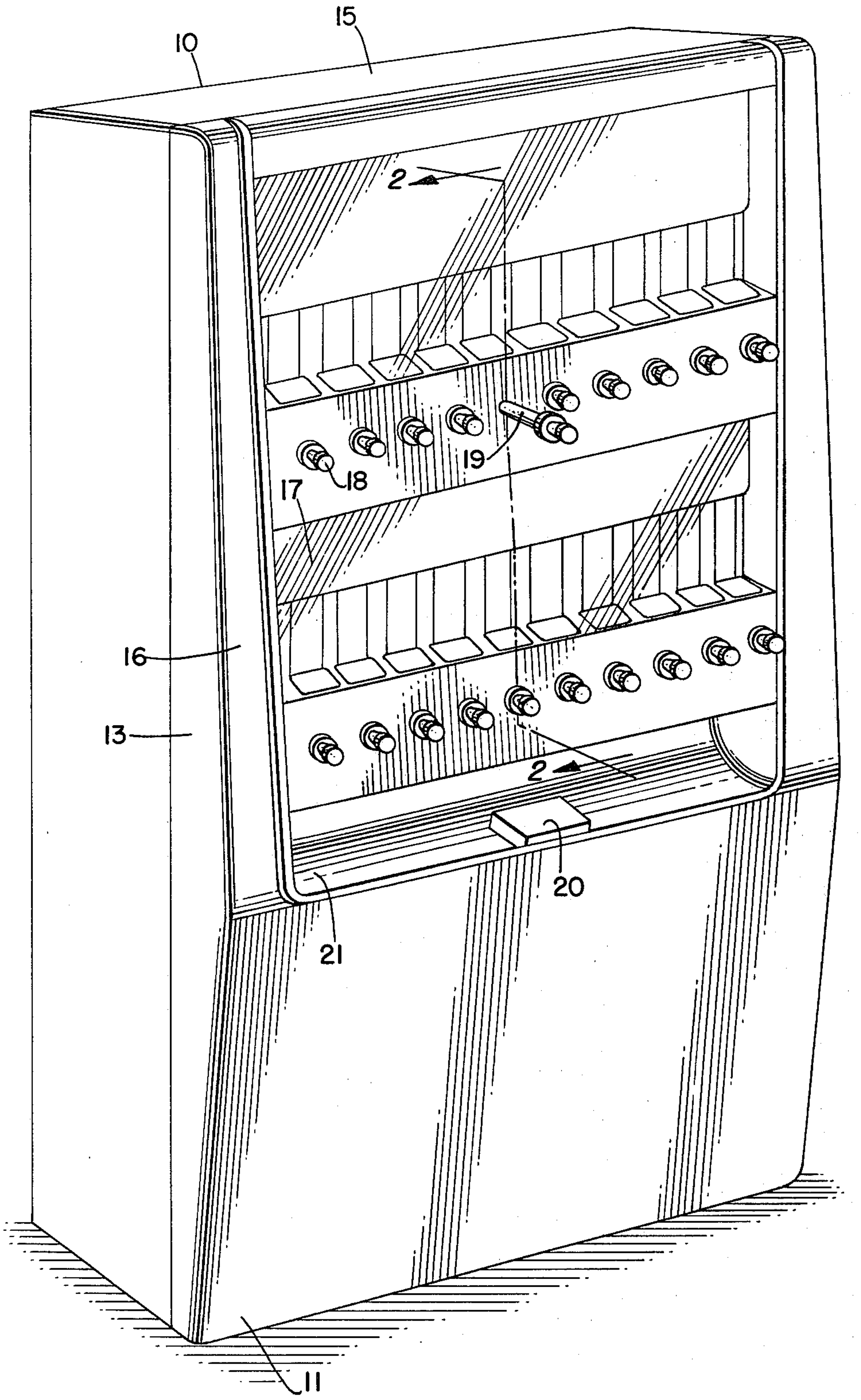
FIG. 1 is a front perspective view of a vending machine of the type that is modified to vend half packs of cigarettes.

Referring now to the drawings there is shown in FIG. 1 a cigarette vending machine consisting of a cabinet 10 having a base 11. The cabinet has right and left walls 13 and 14 and a top wall 15. The cabinet has a door 16. The door 16 is entirely removable from the cabinet. Suitable means (not shown) are provided for holding the door in place and locking it against unauthorized removal. The door has an inclined front panel 17 and a series of knobs, one of these knobs designated 18, to dispense the cigarettes. One of the knobs 19 is shown in the extended position with a half-pack 20 of cigarettes in the dispensing area 21.

Figure 2:
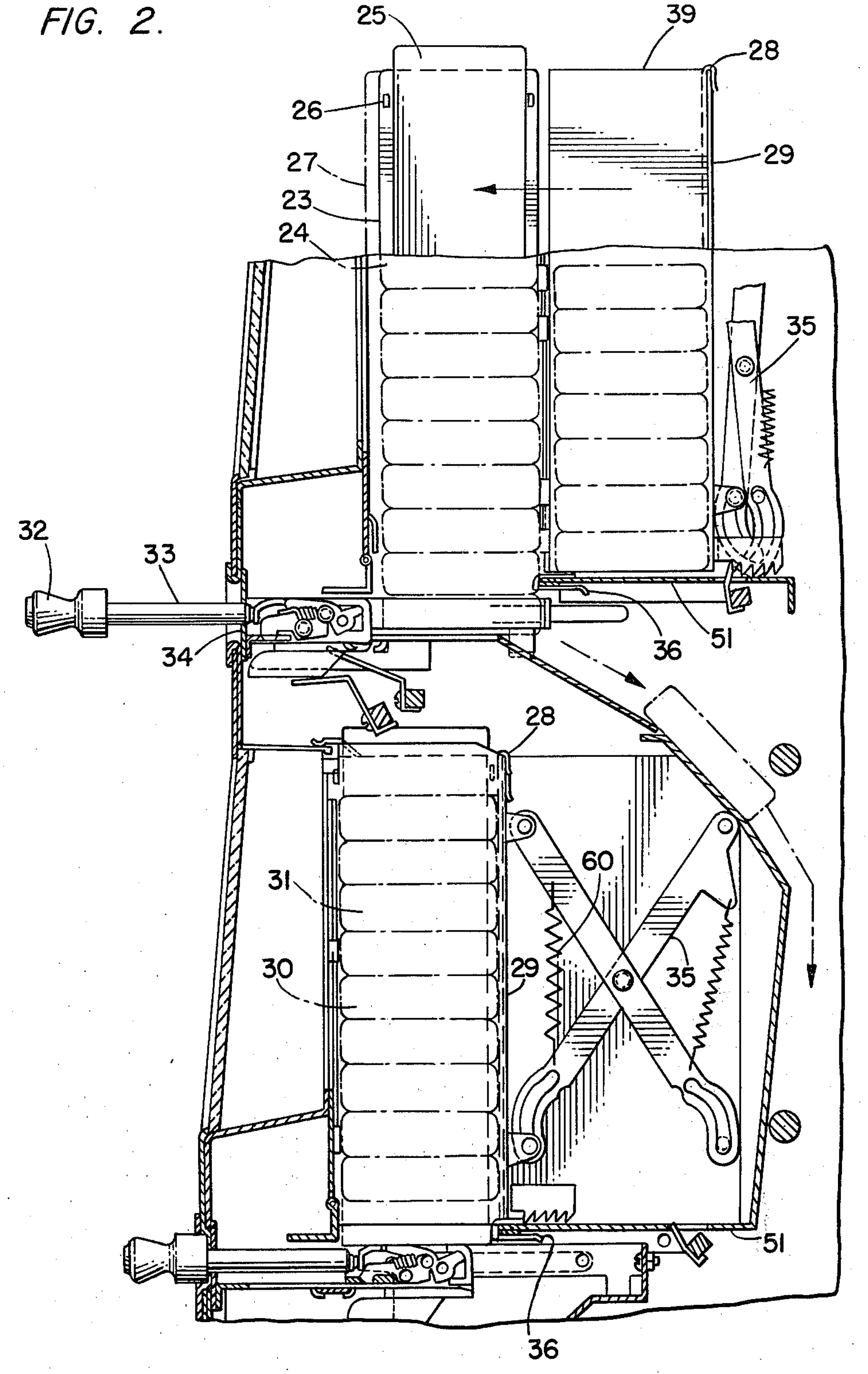
FIG. 2 is fragmentary vertical sectional view taken along line 2—2 of FIG. 1.

FIG. 2 illustrates a machine loaded with half-packs of cigarettes 24. The elements 25 and 39 are shown in place in the upper tier. The element 25 is the U-shaped insert attached by clips 26 to the vertical wall 27 of the forward portion of the magazine. Ears 28 of the L-shaped element 39 are shown attached to the pusher plate 29. The lower tier 30 is shown with the reserve stack of half-packs of cigarettes 31 in the forward position. The ears 28 are shown attached to the pusher plate 29. Several of the elements such as the knob 32 attached to the shaft 33 and the draw bar 34 and the lazy tongs elements 35, for moving the pusher plate 29 forward, are no part of this invention and will not be discussed in detail. Clip 36 is shown attached to the floors 51 of the upper and lower magazine.

Figure 3:
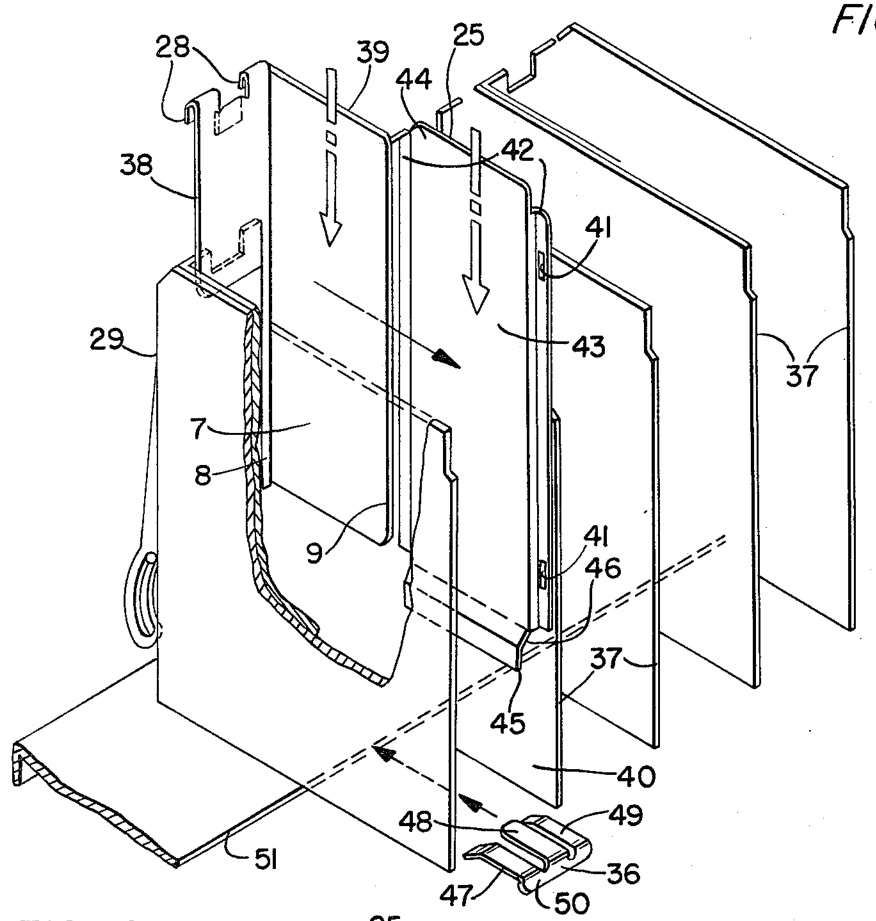
FIG. 3 is a fragmentary perspective view of a portion of the magazine illustrating in the manner in which the elements are placed in position.

Referring now to FIG. 3 which shows a fragmentary perspective view of a portion of the magazines illustrating the manner in which the elements of the instant invention are placed in position. The L-shaped element consists of a short narrow panel 38 and a longer wider panel 7. Three ears 28 are part of the shorter panel 38 and extend outwardly for attachment to the pusher plate 29. Flanges 8 and 9 extend forwardly from the longer wider panel 7 which extends laterally along the vertical wall 37 of the magazine 40. The U-shaped element 25 consists of a flat front panel 43 having flanges 42 with clips 41 punched out of these flanges to fit into apertures (not shown) in the upstanding vertical wall 37 to attach this element to the vertical wall 37. The flanges 42 of element 25 are the same height as the flanges 8 and 9 of element 39. A short downwardly extending flange 45 extends forwardly and parallel to the front panel 43 of element 25 and is connected to the element by the slanting portion 46. An upper portion 44 of the panel 43 extends a short distance above the top of the flanges 42. The clip 36 is shown in detail about to be positioned over the floor 51 of the portion of the magazine 40. The clip consists of two prongs 47 and 49 bent slightly downwardly in their forward position and a straight prong 48. The clip has a flange 50 as front thereof.

Figure 4:
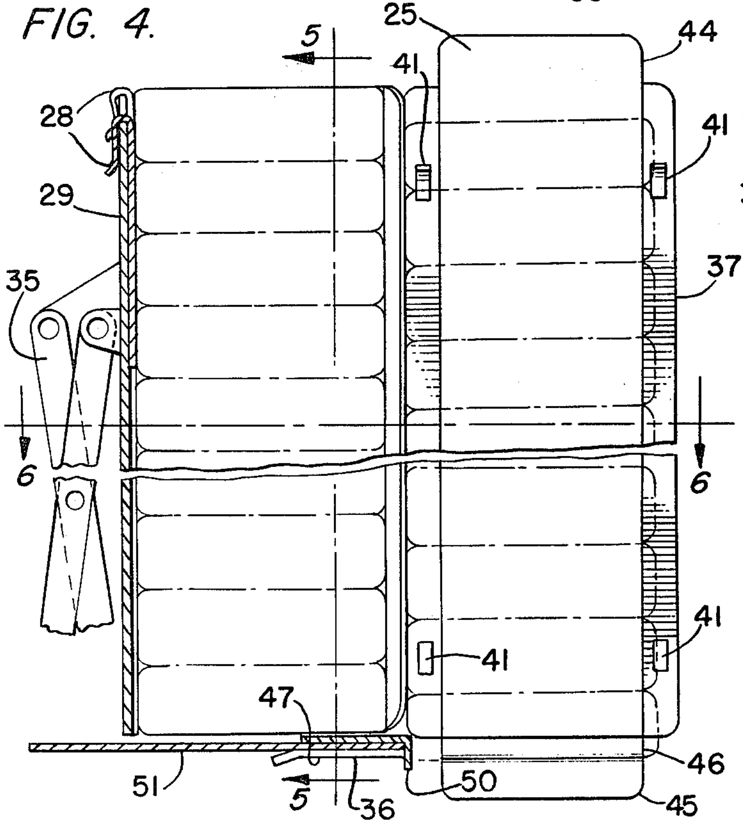
FIG. 4 is a fragmentary vertical sectional view through the magazine with the elements of FIG. 3 in place and with both stacks of the magazine loaded.

Referring now to FIG. 4 which is a vertical section view through the magazines showing the elements of FIG. 3 in place. The ears 28 are shown positioned over the pusher plate 29. The four clips 41 are shown attaching the element 25 to the vertical wall 37 of the magazine. The clip 36 is shown in place showing the lower prongs 47 and 49, the upper prong 48 and the flange 50 in position over the floor 51 of the magazine that supports the reserve stacks. The portion 44 of the element 25 is shown extending above the top of the stack of half-packs of cigarettes in the forward portion of the magazine. The flange 45 in the connecting member 46 are shown in position extending below the bottom of the lowermost package of cigarettes in the stack. The pusher element 35 is shown fragmentarily in the retracted position.

Figure 5:
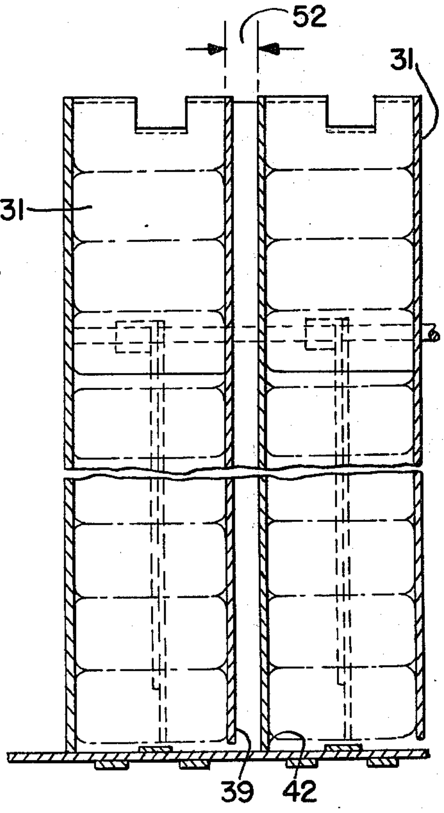
FIG. 5 is a vertical cross-sectional view taken along line 5—5 of FIG. 4.

FIG. 5 is a vertical cross-sectional view along the lines 5—5 of FIG. 4 and shows the magazine fully loaded with half-packs 31 of cigarettes. It illustrates the two stacks of these cigarettes and illustrates that the distance 52 between the elements 25 and 39 is quite small. By actual measurement this distance, in the preferred embodiment, is three-eighths of an inch.

Figure 6:
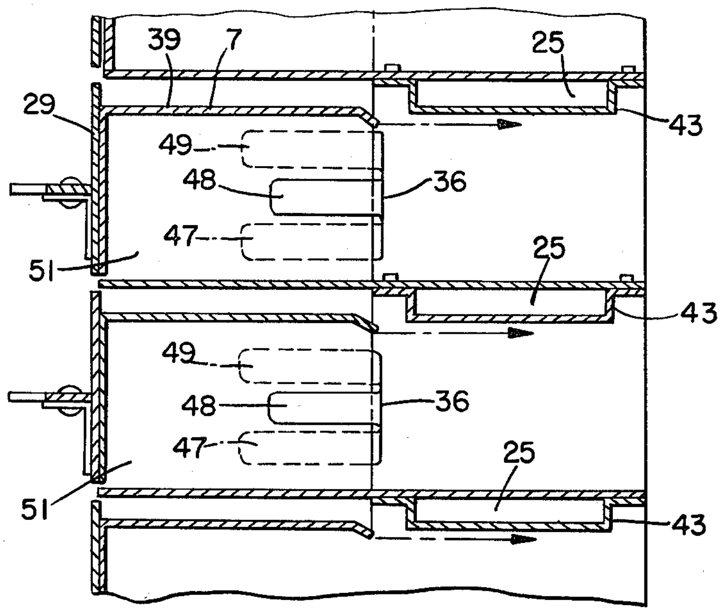
FIG. 6 is a horizontal cross-sectional view showing the three elements of the apparatus in place.

Referring now to FIG. 6 which is a horizontal cross-section showing the three elements of the apparatus in place and showing how the elements cooperate to maintain the two stacks of half-packs in the proper position in the front and the rear portion of the magazine. This figure shows the clip element 36 in position with the prongs 47, 48 and 49 positioned over the floor 51 of the magazine. It can be seen that the flange 9 of element 39 extends forward in a manner that would keep the reserve stack of half-packs of cigarettes in the proper stack position. It also shows that when the reserve stack is moved forward by the action of the pusher mechanism 35 the flange 9 and the front panel 7 of the element 39 would be easily passed by the front panel 43 of the U-shaped element 25.

Figure 7:
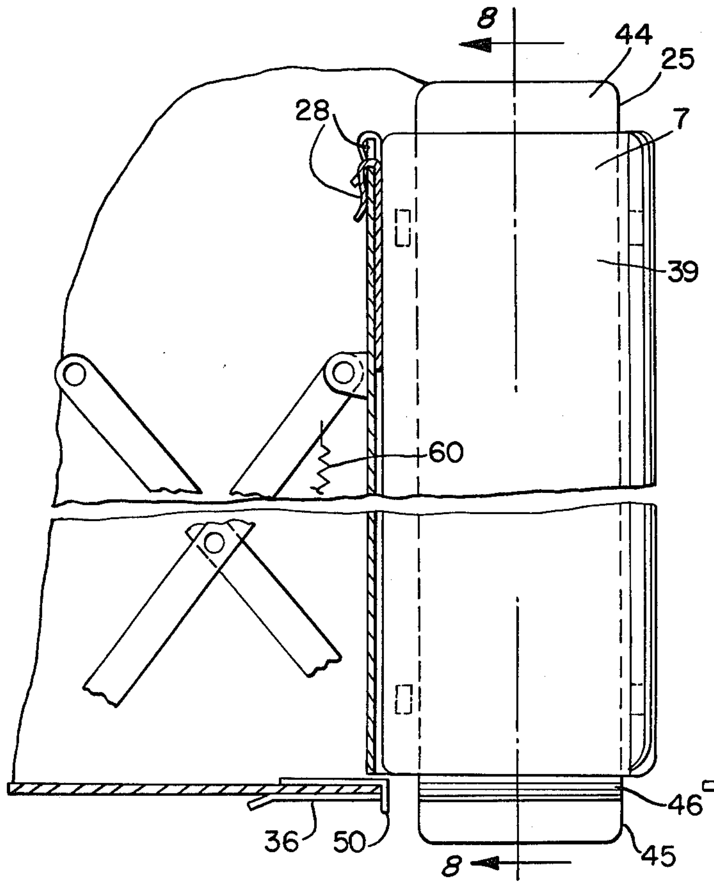
FIG. 7 is a cross-sectional view showing the reserve stack in vending position.

Referring now to FIG. 7 which is the vertical sectional view similar to FIG. 4 showing the reserve stack in vending position. In this view, the L-shaped element 39 is moved in position in front of the element 25. The upwardly extending portion 44 of element 25 and the flange members 45 and 46 of element 25 cooperate with the flange 50 of the clip element 36 to keep the stack in the proper position and to prevent vending of more than one pack of cigarettes when the knob 9 is in the extended position as shown in FIG. 1.

Figure 8:
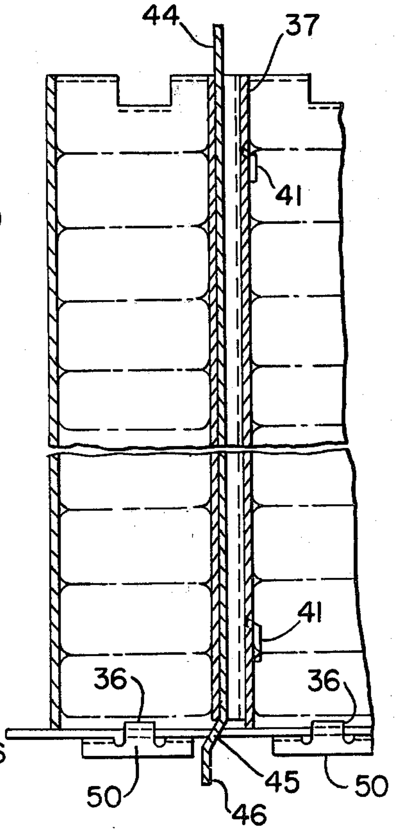
FIG. 8 is a vertical sectional view taken along line 8—8 of FIG. 7.

Referring now to FIG. 8 which is a vertical sectional view taken along line 8—8 of FIG. 7. This view illustrates the method of attachment of the U-shaped element 25 to the upstanding vertical wall 37 and shows the position of the upper portion 44 of element 25 and the flange members 45 and 46 of this element as well as the position of the flange 50 of element 36.

In operation, the adaptor kit is attached to the magazine in the following manner. The spring 60 on the pusher element 35 is released and the ears 28 of element 39 are positioned over the pusher plate 29. The spring is then returned to its original position and the pusher element 35 is collapsed and the element 25 is attached to the upstanding vertical wall 37 of the magazine by means of the clips 41 which are positioned in apertures in the wall. The clip 36 is positioned over the floor 51 of the magazine. The magazine is then ready to be filled with the primary stack and the reserve stack of half-packs of cigarettes. The design of the element 25 to have the portion 44 extending above the stack of cigarettes in the flange members 45 and 46 extending below the stack to keep the stack of half-packs of cigarettes in the proper vertical position. The clip element 36 cooperates with the elements 45 and 46 to assure that only one pack of cigarettes is vended at a time. The adaptor kit can be used in machines that vend the shorter cigarettes as well as the longer 100 millimeter cigarettes. The only modification requires is a slight lateral extension of the clip 36 when the longer cigarettes are vended. By the use of this kit both the half-packs and regular size packs of cigarettes can be vended by the same machine. It is, of course, not necessary to install the kit in each of the magazines of the machine.

What is claimed is:

1. An apparatus for adapting a conventional mechanical cigarette vending machine, in which the machine includes a plurality of magazines for containing primary stacks and reserve stacks of cigarettes and pusher plates to move said reserve stacks forward, to vend half packs of cigarettes said apparatus comprising:

(a) a generally elongate L-shaped element having a short narrow panel and a longer wider panel said short panel having downwardly extending ears on the top thereof, said longer wider panel having the same width as the length of a pack of cigarettes, said wider longer panel having a flange extending the full length of thereof on one side and extending from the lower end of the shorter narrower panel the balance of the length of said L-shaped element;

(b) a second elongate flat U-shaped element, the front panel of said element having narrow L-shaped flanges on either side thereof, said L-shaped flanges having at least four small clips punched out of the portion of the L-shaped flanges parallel to the flat panel, the main portion of the panel having the same length as the width of a pack of cigarettes, a portion of the panel extending a short distance above said L-shaped flanges, a part of the panel extending below said L-shaped flanges being formed into a flange that exends forward a short distance from the surface of the panel and having a portion bent downwardy parallel to the panel;

(c) a clip element having three prongs extending laterally in side-by-side relationship, the outer two of these prongs being bent slightly at the forward end thereof, the clip having a flange extending the full width thereof.

2. The apparatus according to claim 1 wherein each of the elements is formed from a single piece of metal.

3. The apparatus according to claim 1 wherein the clips on said L-shaped element connect said L-shaped panel to said pusher plate.

4. The apparatus according to claim 1 wherein the small clips in the flanges of said U-shaped element connect said element to the wall of the magazine in front of said L-shaped element.

5. The apparatus according to claim 1 wherein said clip element is attached to the floor of said magazine below the reserve stack of cigarettes, by means of three prongs.

* * * * *